US011218430B2

(12) United States Patent
Smyers et al.

(10) Patent No.: US 11,218,430 B2
(45) Date of Patent: Jan. 4, 2022

(54) SYSTEM AND METHOD FOR IN-ACCOUNT COLLABORATIVE FEATURES

(71) Applicant: Zipwhip, Inc., Seattle, WA (US)

(72) Inventors: Michael Smyers, Seattle, WA (US); Russell Paul Wirtz, Seattle, WA (US); Anthony Riemma, Seattle, WA (US); James Lapic, Kirkland, WA (US); Felicia Deng, Seattle, WA (US); Daniel deMarteleire, Seattle, WA (US)

(73) Assignee: Zipwhip, Inc., Seattle, WA (US)

(*) Notice: Subject to any disclaimer, the term of this patent is extended or adjusted under 35 U.S.C. 154(b) by 0 days.

(21) Appl. No.: 16/867,251

(22) Filed: May 5, 2020

(65) Prior Publication Data

US 2021/0352027 A1 Nov. 11, 2021

(51) Int. Cl.
*H04L 12/00* (2006.01)
*H04L 12/58* (2006.01)
*G06F 9/451* (2018.01)

(52) U.S. Cl.
CPC ............. *H04L 51/04* (2013.01); *G06F 9/451* (2018.02); *H04L 51/24* (2013.01); *H04L 51/26* (2013.01)

(58) Field of Classification Search
CPC ..... H04L 51/26; H04L 51/04; H04L 65/1083; H04L 51/046; G06F 15/02; G06F 3/0482; H04M 1/72436; G06Q 10/10
USPC ....................... 709/206, 204, 205
See application file for complete search history.

(56) References Cited

U.S. PATENT DOCUMENTS

| | | | |
|---|---|---|---|
| 7,124,372 B2* | 10/2006 | Brin | G06F 3/04847 715/751 |
| 8,793,596 B2 | 7/2014 | Arad | |
| 8,943,422 B2 | 1/2015 | (Arad) | |
| 9,160,852 B2* | 10/2015 | Ripa | H04M 3/5133 |
| 9,246,857 B2 | 1/2016 | Moisa | |
| 9,274,691 B2 | 3/2016 | Coe et al. | |
| 9,304,665 B2 | 4/2016 | Coe | |
| 9,325,643 B2* | 4/2016 | Klassen | G06F 15/02 |
| 9,892,105 B2 | 2/2018 | Umapathy et al. | |
| 9,973,462 B1 | 5/2018 | Petersen | |
| 10,708,202 B2* | 7/2020 | Klassen | H04L 51/04 |
| 10,735,353 B2* | 8/2020 | Klassen | H04L 51/26 |
| 2008/0028031 A1* | 1/2008 | Bailey | G06Q 10/10 709/207 |
| 2011/0219088 A1* | 9/2011 | Klassen | G06F 15/02 709/206 |
| 2013/0301482 A1* | 11/2013 | Katis | H04L 65/1083 370/276 |

(Continued)

*Primary Examiner* — Frantz Coby
(74) *Attorney, Agent, or Firm* — Rowan TELS LLC (57) ABSTRACT

A method and apparatus for configuring a plurality of graphical user interfaces to display conversations including a message queue, and re-configuring the plurality of graphical user interfaces to display a first visual indication for a first group of conversations in response to a timer determining that a pre-determined time period has elapsed from the previous timestamp for the first group of conversations. Messages are received and associated with a timestamp, which may update the timestamp of a conversation. These messages are added to a conversation in the message queue and may be prioritized along with the other conversations. Further visual indications may be added to the plurality of graphical user interfaces based on actions of operator accounts.

20 Claims, 10 Drawing Sheets

(56) References Cited

U.S. PATENT DOCUMENTS

| | | | |
|---|---|---|---|
| 2014/0343937 A1* | 11/2014 | Katis | H04L 51/046 |
| | | | 704/235 |
| 2016/0149847 A1 | 5/2016 | Moisa | |
| 2016/0218998 A1 | 7/2016 | Sheth et al. | |
| 2016/0277343 A1* | 9/2016 | Ji | G06F 3/0482 |
| 2017/0034104 A1* | 2/2017 | Klassen | H04M 1/72436 |
| 2017/0187652 A1 | 6/2017 | Brauninger et al. | |
| 2018/0102990 A1* | 4/2018 | Klassen | H04M 1/72436 |

* cited by examiner

SYSTEM AND METHOD FOR IN-ACCOUNT COLLABORATIVE FEATURES

BACKGROUND

Multiple users may collaborate in various environments, including in environments to respond to messages from clients. Communication amongst the multiple users is crucial to efficiently responding to the client messages and to ensure that a client is not lost due to neglect. As the number of users increases or as the users become more distributed in a physical space, the ability of the users to communicate with each other diminishes. Thus, collaborative features are needed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The present method and apparatus configure a plurality of graphical user interfaces to display a prioritized message queue. The display is also configured to present visual indicators of events to enable efficient use of the plurality of graphical user interfaces by multiple users. The visual indicators enable each operator to prioritize responses to customers and to ensure that each customer receives a response. A first technical problem is that each operator may not know which messages or conversations another operator is responding to or whether they should respond to a newly received message. As the system tags each conversation display with the last operator to respond to a previous message, each operator may be able to determine whether they should respond or whether another operator is likely to respond. However, operators may be called to work in other areas, may take breaks, or may reach the end of a work shift. By utilizing pre-determined time period to activate a timer to re-configure the graphical user interfaces, the conversations that are no longer being attended to may have another operator respond. By increasingly escalating the visual indicator, the system further ensures that the unresolved message receives attention by an operator. Thus, the overall response time for replies may be decreased, and the system made more efficient. Furthermore, another technical problem is that multiple operators may sometimes duplicate work. Having an indication that another operator is working toward a response to one message may permit another operator, who may duplicate such work, to focus on another message. This may increase the number of messages replied to in a given amount of time, thereby increasing the efficiency of the system.

Figure 1:
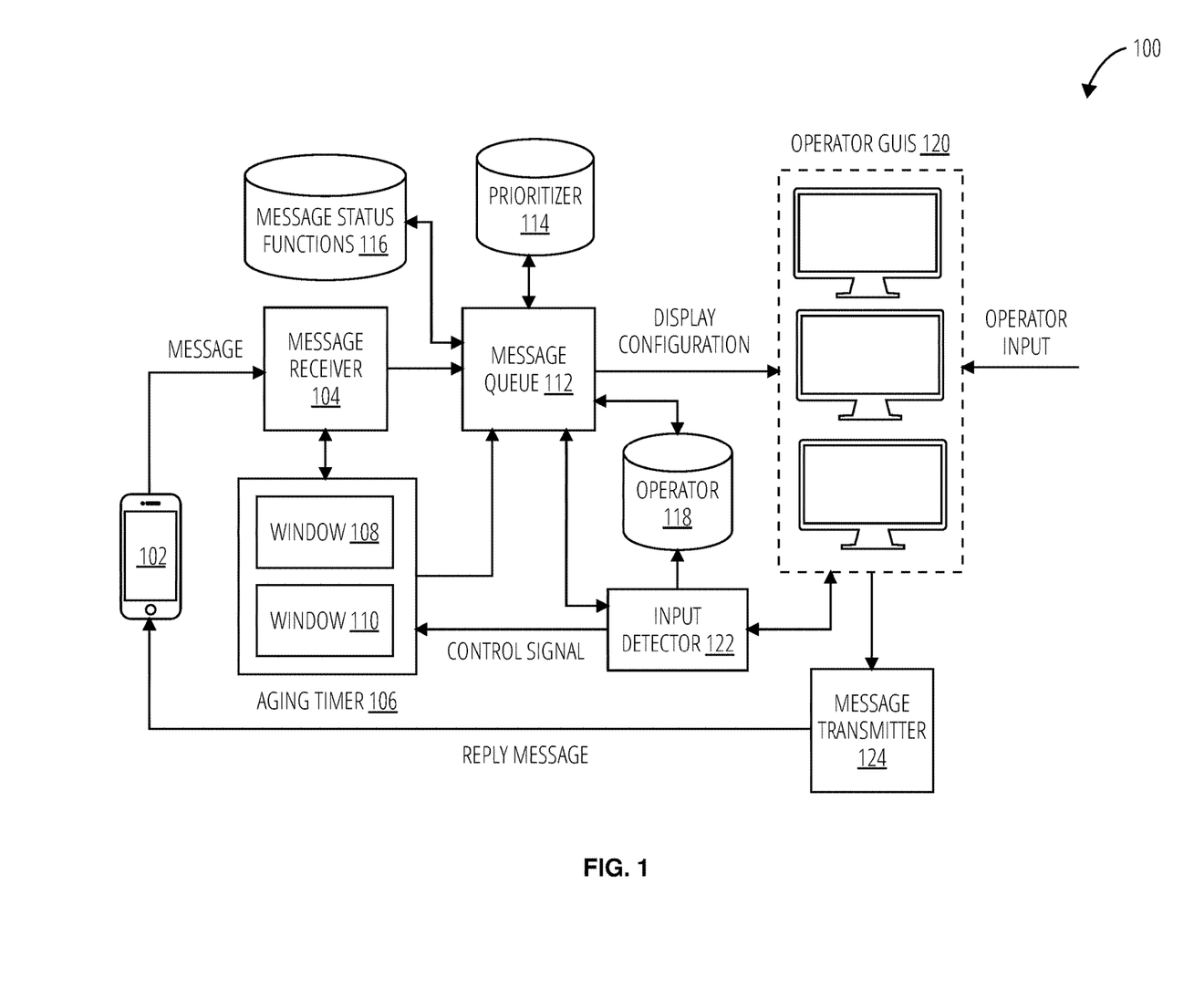
FIG. 1 illustrates an embodiment of a system 100.

Referring to FIG. 1, a system 100 comprises a client device 102, a message receiver 104, an aging timer 106, a message queue 112, a prioritization control memory structure 114, a message status functions control memory structure 116, an operator control memory structure 118, an operator graphical user interfaces 120, an input detector 122, and a message transmitter 124. The aging timer 106 further comprises a window 108 and a window 110.

The client device 102 sends messages to the message receiver 104 and receives reply messages from the message transmitter 124. The reply messages may configure the client device 102 to display content, such as text on a display associated with the client device 102. The client device 102 may also send and receive the messages and reply messages from a server, such as a short message service (SMS) server. The client device 102 and thus the message may be associated with a client account. The client device 102 (or the SMS server) may apply a timestamp to the message.

The message receiver 104 receives a message from the client device 102. In some embodiments, the message receiver 104 receives the message from the SMS server. The message receiver 104 may add a timestamp to the message. The timestamp may be associated with the time the message was received by the message receiver 104. In other embodiments, the message receiver 104 may utilize the timestamp added by the client device 102 or SMS server. The message receiver 104 sends a control signal to the aging timer 106 to begin a timer for the message, update a timer, or restart a previously stopped timer. The message receiver 104 sends the message to the message queue 112.

The aging timer 106 may include one or more windows, such as the window 108 and the window 110. The windows are associated with pre-determined time periods. For example, the window 108 may have a first pre-determined time period of about five (5) minutes, and the window 110 may have a second pre-determined time period of about twenty (20) minutes. Once the pre-determined time period has elapsed for a message (or conversation), the aging timer 106 sends a control signal to the message queue 112. The control signal causes the message queue 112 to configure the message (or the conversation) to be displayed on the operator graphical user interfaces 120 in a different manner. The message queue 112 may receive instruction for display from the aging timer 106 or the instructions may be stored in the message status functions control memory structure 116. The aging timer 106 may begin a timer for a message when a control signal is received from the message receiver 104. The aging timer 106 may also determine that the message is associated with a conversation (or group of messages and reply messages). The aging timer 106 may receive a control signal from the message queue 112 to determine whether the message is associated with a conversation. The aging timer 106 may update a timer for a message received or may determine to maintain a previously activated timer. The aging timer 106 may receive a control signal from the input detector 122 to stop, reset, or delete a timer in response to a reply message associated with the message.

The message queue 112 receives messages from the message receiver 104. The message queue 112 determines whether the message is part of a conversation. The message queue 112 may generate a new conversation for a message that is not part of a pre-existing conversation. The message queue 112 selects and receives a prioritization scheme from the prioritization control memory structure 114. The prioritization may order the conversations based on the timestamp of the conversation. For example, conversation with an earlier timestamp may be oriented to the top of the operator graphical user interfaces 120. The timestamp may be based on the last received message in the conversation, the last sent reply message, or a previously received message. The conversations may further be prioritized based on the operator account associated with the conversation or the client account associated with the conversation. The message queue 112 may prioritize the conversations differently for each of the operator graphical user interfaces 120 based on the operator account associated with the conversation. For example, conversations with the operator account that is the same operator account as the user of one of the operator graphical user interfaces 120 may be oriented to the top of that one of the operator graphical user interfaces 120. Conversations with no associated operator account may be oriented to the top of each of the operator graphical user interfaces 120. The message queue 112 may receive a control signal from the message status functions control memory structure 116 to determine how to configure the operator graphical user interfaces 120 in response to an event. The message status functions control memory structure 116 may store instructions regarding how to respond to new messages, the elapse of one or more windows, whether and how to display the customer account (or client account), whether and how to display the operator account, how to display the message content, how to display responding actions, etc. The message queue 112 receives a control signal from the operator control memory structure 118 to determine the operator account associated with a message or conversation. The message queue 112 may then configure each of the conversations to display the associated operator account on the operator graphical user interfaces 120. The message queue 112 receives a control signal from the input detector 122, which may indicate that a responding action is occurring at one or more of the operator graphical user interfaces 120. The message queue 112 may determine the operator account associated with the responding action and re-configure the conversations to include an indication of the responding action to be displayed on the operator graphical user interfaces 120. The message queue 112 sends a control signal to the operator graphical user interfaces 120 to configure the operator graphical user interfaces 120 to display the conversations, as well as indications regarding customer account, operator account, responding actions, elapsed timers, priority of conversations, etc.

The prioritization control memory structure 114 stores prioritization instructions. The prioritization instructions are selected by the message queue 112 and utilized to orient the conversations on the operator graphical user interfaces 120.

The message status functions control memory structure 116 stores display instructions for the various events. The message status functions control memory structure 116 may store instructions regarding how to respond to new messages, the elapse of one or more windows, whether and how to display the customer account (or client account), whether and how to display the operator account, how to display the message content, how to display responding actions, etc.

The operator control memory structure 118 stores the operator account associated with each reply message and the operator account associated with each conversation. The operator control memory structure 118 receives a control signal from the input detector 122 to determine the operator account associated with a reply message, which may update the operator account associated with a conversation. The operator account is then sent to the message queue 112, which then may re-configure the operator graphical user interfaces 120.

The operator graphical user interfaces 120 receive configuration instructions from the message queue 112. Each of the operator graphical user interfaces 120 may receive different configuration instructions. The operator graphical user interfaces 120 may receive operator input including receiving text in a text message box associated with a conversation (i.e., a responding action), a reply message generation signal to send a reply message to the client device 102 utilizing the message transmitter 124, or cessation actions, such as losing focus on a window associated with the responding action or deleting the message or the one of the one or more conversations from the message queue 112.

The input detector 122 determines whether an input has occurred at the operator graphical user interfaces 120. The input detector 122 then sends a control signal to a component of the system 100 in response. The input detector 122 may send a control signal to the aging timer 106 in response to an action input, such as sending a reply message or deleting a message or conversation to stop, delete, or update the aging timer 106. The input detector 122 may send a control signal to the message queue 112 in response to a responding action for the message queue 112 to add an indication to the associated conversation, such as the operator account performing the responding action. The input detector 122 may send a control signal to the operator control memory structure 118 to update the operator account associated with a conversation in response to a reply message being sent in response to an action by one of the operator graphical user interfaces 120.

The message transmitter 124 receives a message body from inputs to the operator graphical user interfaces 120 as well as a message generation signal from one of the operator graphical user interfaces 120 to send a reply message to a client device 102 with the message body. The reply message may be sent via a SMS server.

Figure 2:
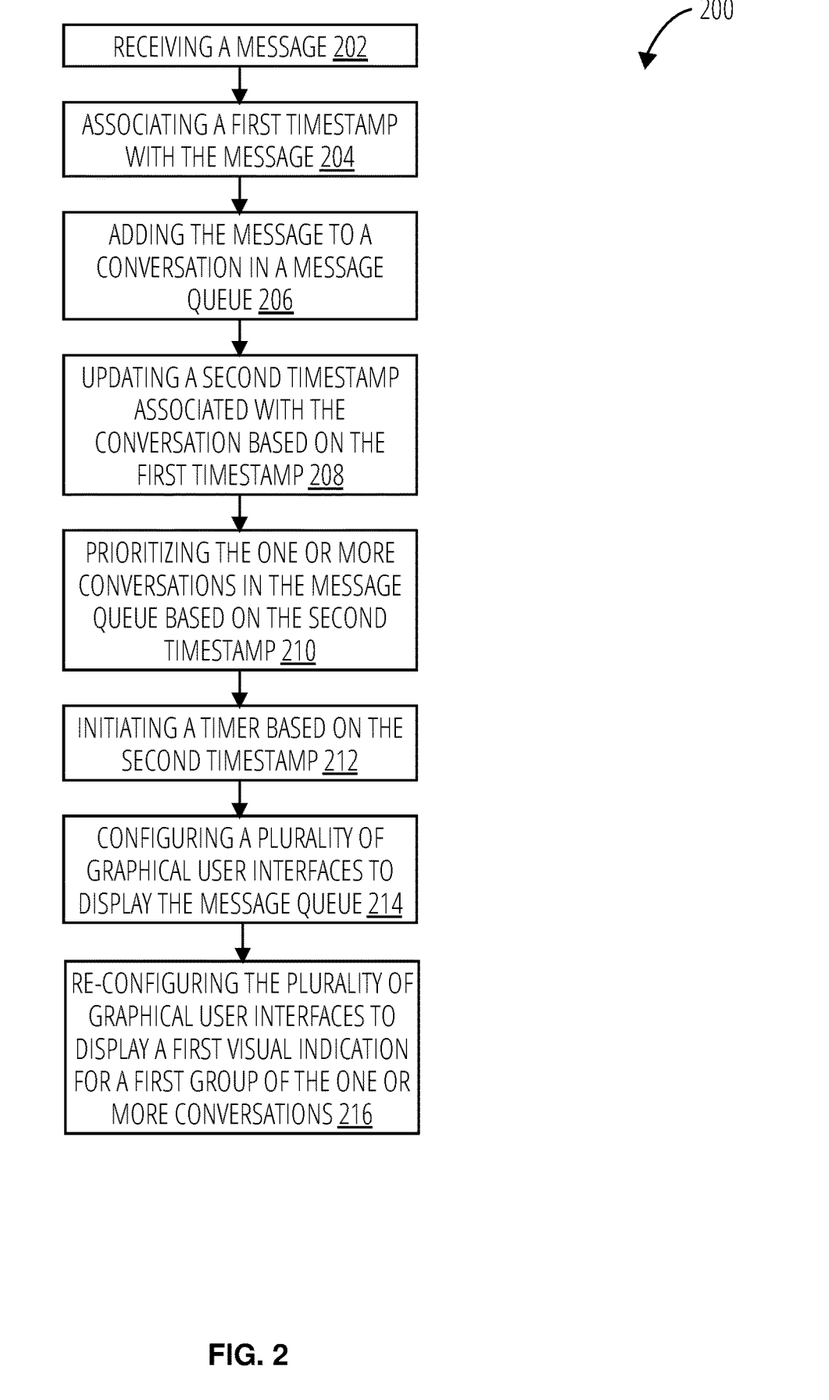
FIG. 2 illustrates an embodiment of a method 200.

Referring to FIG. 2, a method 200 receives a message (block 202). A first timestamp is associated with the message (block 204). The first timestamp may be assigned when received by a message receiver, when sent by a client device, sent or received by a SMS server, etc. The message is added to a conversation in a message queue (block 206). The message queue may comprise one or more conversations. Each of the one or more conversations may have a second timestamp. The message may be associated based on the customer account from which the message was received. The second timestamp is updated based on the first timestamp (block 208). The process depicted in FIG. 3 may be utilized to update the second timestamp. The one or more conversations in the message queue are prioritized based on the second timestamp (block 210). The priority may be based on a conversation with an earlier second timestamp receiving a higher priority. A timer is initiated based on the second timestamp (block 212). The timer may determine pre-determined time periods. The timer then sends a control signal to update the message queue when the timer determines that the pre-determined time periods have elapsed. A plurality of graphical user interfaces is configured to display the message queue (block 214). The plurality of graphical user interfaces is re-configured to display a first visual indication for a first group of the one or more conversations in response to the timer determining that a first pre-determined time period has elapsed from the second timestamp for the first group of the one or more conversations (block 216).

In some embodiments, the plurality of graphical user interfaces is re-configured to display a second visual indication for a second group of the one or more conversations in response to the timer determining that a second predetermined time period has elapsed from the second timestamp for the second group of the one or more conversations, the second group being a subset of the first group. In further embodiments, an action input is determined to have been received at one of the plurality of graphical user interfaces. In response, the timer is stopped, updated, or reset. An action input may include operating one of the plurality of graphical user interfaces to send a reply message to the message, as well as the deletion of a message or conversation. In either case the timer associated with the conversation or message is stopped, updated, or reset. In yet further embodiments, in response to receiving the message, the plurality of graphical user interfaces is configured to display an alert indication.

Figure 3:
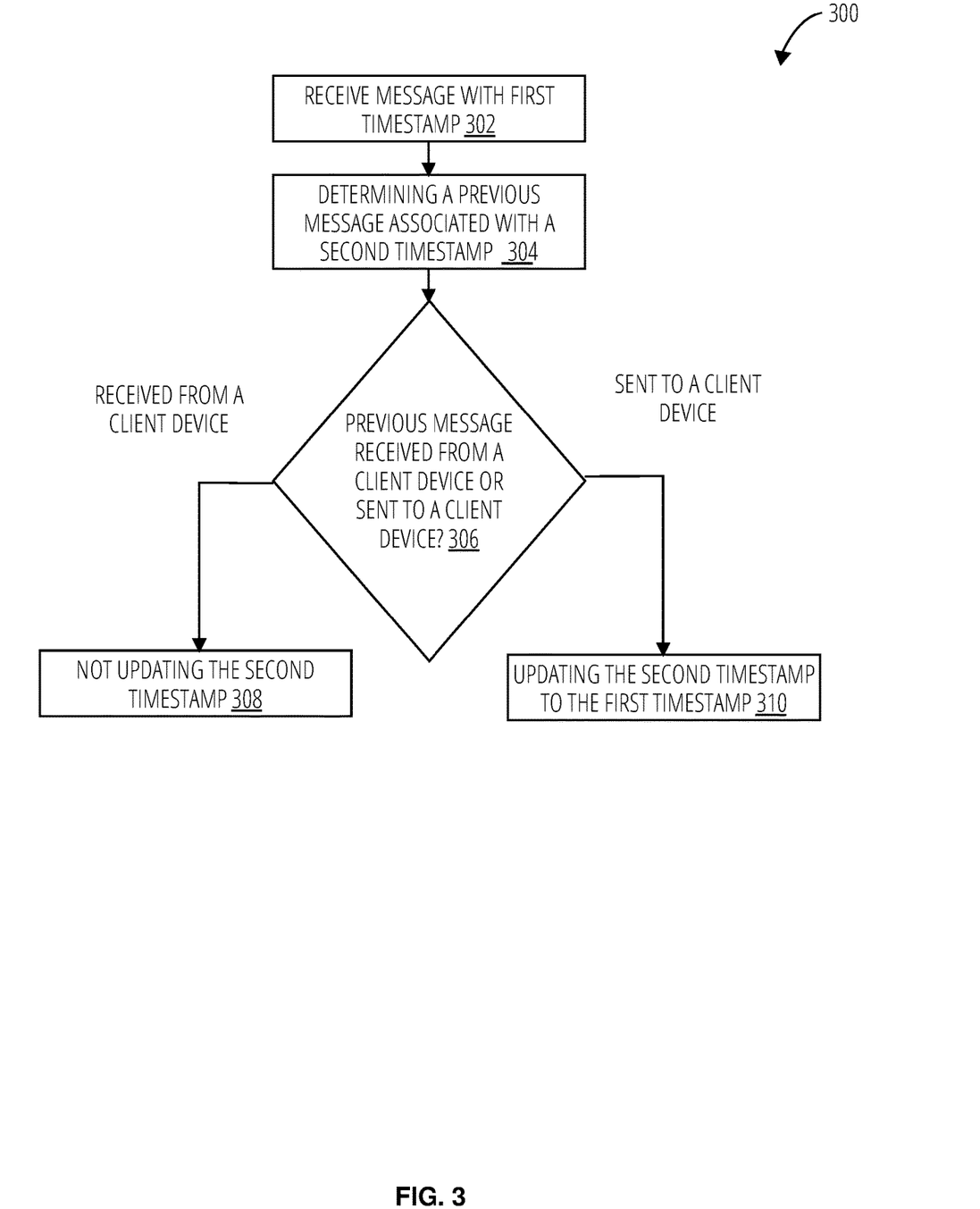
FIG. 3 illustrates an embodiment of a method 300.

Referring to FIG. 3, a method 300 updates the second timestamp associated with the conversation based on the first timestamp associated with a received message (block 302). A previous message is determined to be associated with the second timestamp (block 304). The message may be stored in a control memory structure along with other messages in a conversation. Each may have an associated timestamp. The method 300 determines whether the previous message was either (a) received from a client device, or (b) sent to a client device (decision block 306). If the previous message was received from a client device, the second timestamp is not updated (block 308). If the previous message was sent to a client device, the second timestamp is updated to the first timestamp (block 310).

Figure 4:
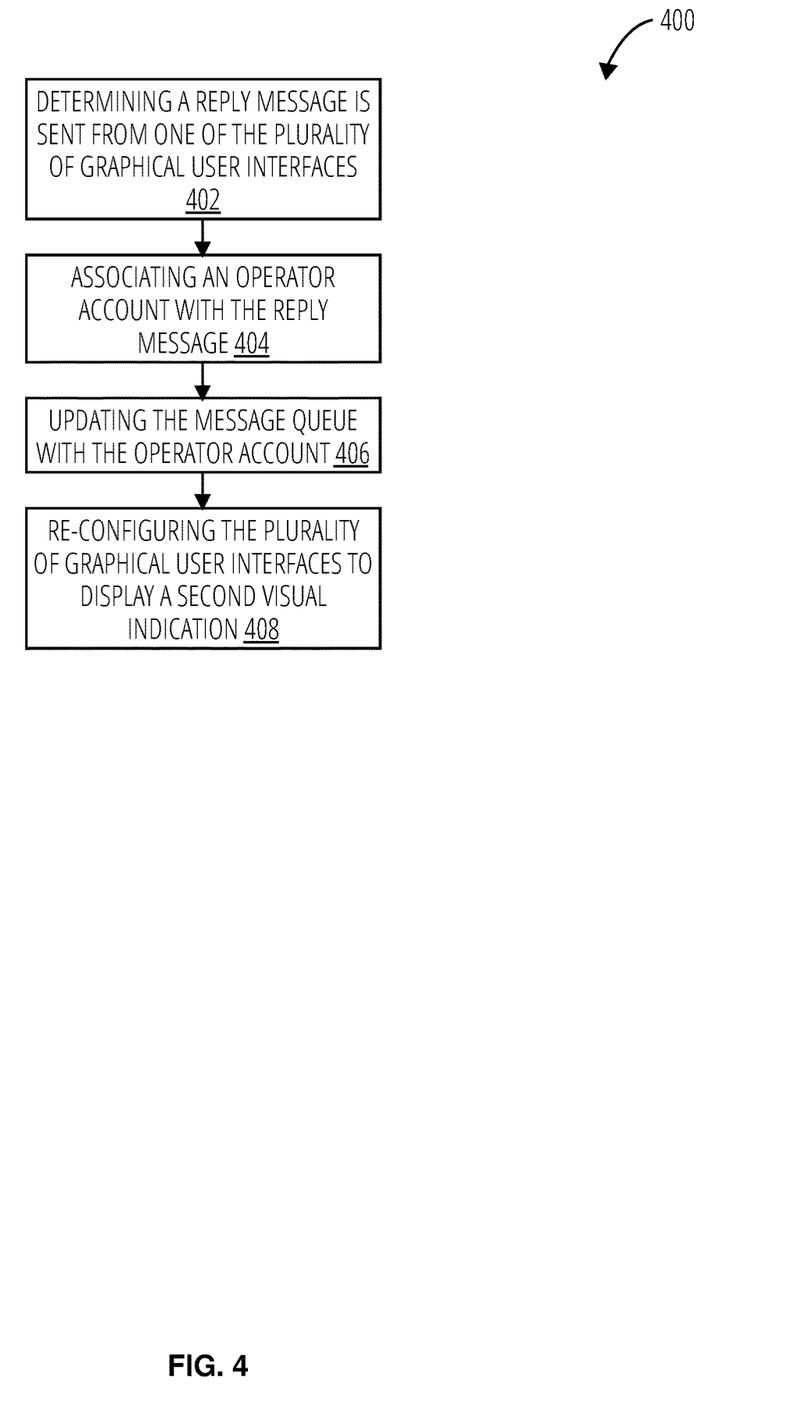
FIG. 4 illustrates an embodiment of a method 400.

Referring to FIG. 4, a method 400 determines a reply message is sent from one of the plurality of graphical user interfaces (block 402). An operator account is associated with the reply message (block 404). The associated operator account may be the operator account associated with the one of the plurality of graphical user interfaces that sent the reply message. An operator control memory structure may store the association. The message queue is updated with the operator account (block 406). The plurality of graphical user interfaces is re-configured to display a second visual indication (block 408). The second visual indication may indicate the operator account associated with the reply message.

Figure 5:
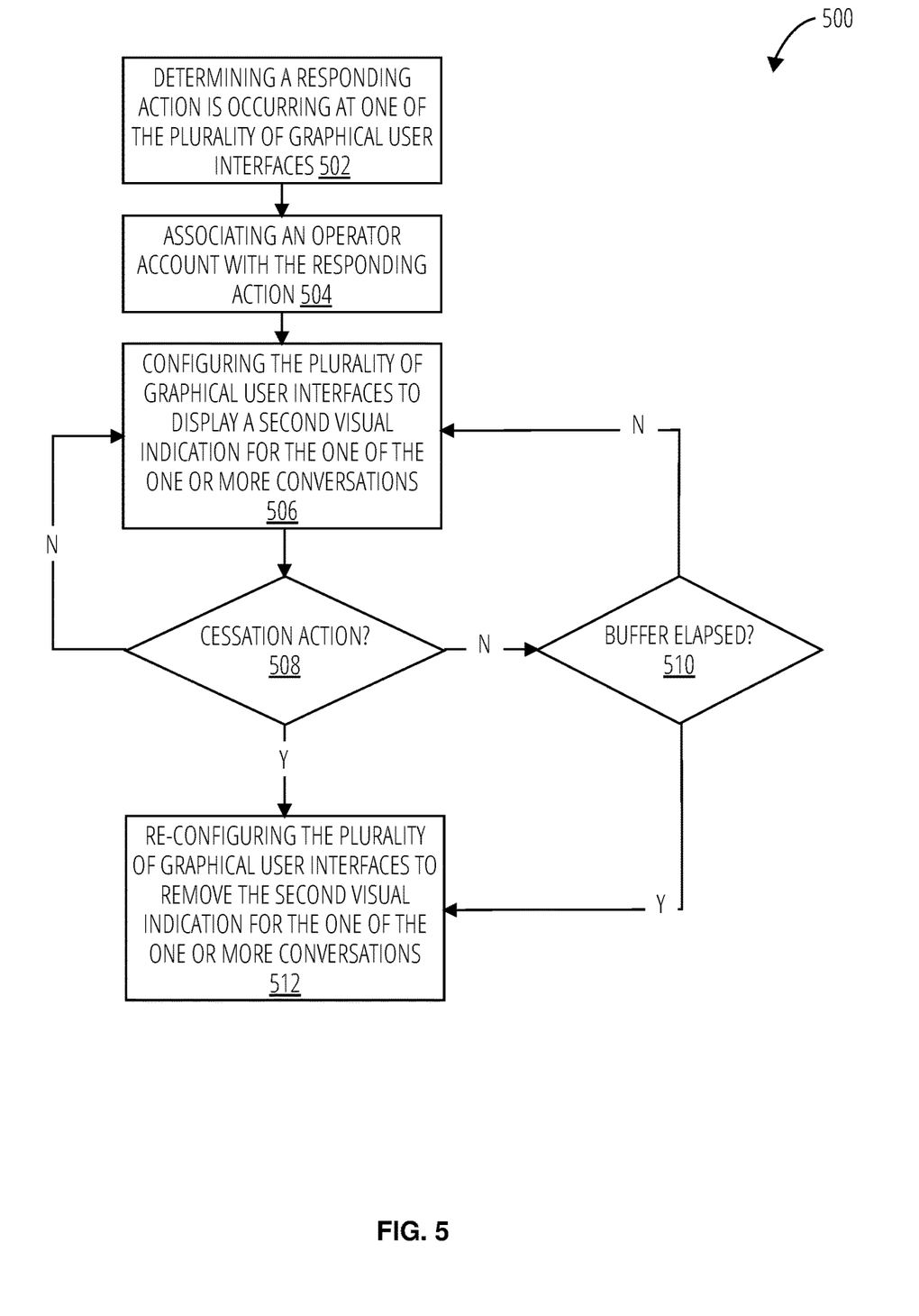
FIG. 5 illustrates an embodiment of a method 500.

Referring to FIG. 5, a method 500 determines that a responding action is occurring at one of the plurality of graphical user interfaces (block 502). The responding actions may include receiving text in a text message box associated with one of the one or more conversations. An operator account is associated with the responding action (block 504). The operator account may be the operator account associated with operating the graphical user interface receiving the responding action. The plurality of graphical user interfaces is re-configured to display a second visual indication for the one of the one or more conversations (block 506). The second visual indication may indicate the operator account associated with the responding action. The second visual indication may also indicate the responding action being taken. The method 500 then determines whether a cessation action has occurred at the one of the plurality of graphical user interfaces that received the responding action (decision block 508). The cessation action may include losing focus on a window associated with the responding action and deleting the message or the one of the one or more conversations from the message queue. If not, the method 500 determines whether a buffer time period has elapsed (decision block 510). Exemplary buffer time periods include about ten (10) seconds or about thirty (30) seconds. If not, the method 500 maintains the configuration with the second visual indication. If a cessation action has been taken or the buffer time period has elapsed, the plurality of graphical user interfaces are re-configured to remove the second visual indication for the one of the one or more conversations (block 512).

In some embodiments, a second timer may be utilized to determine whether the buffer time period has elapsed. The buffer time period is determined (e.g., ~10 seconds). The buffer time period may be received as an input to the system or stored in a control memory structure. The second timer is initiated in response to an initial responding action. The second timer is then reset in response to a subsequent responding action, If no subsequent responding action to either the initial responding action or a subsequent responding action is received, the second timer determines the buffer time period has elapse, which may result in re-configuring the plurality of graphical user interfaces to remove the second visual indication for the one of the one or more conversations.

Figure 6:
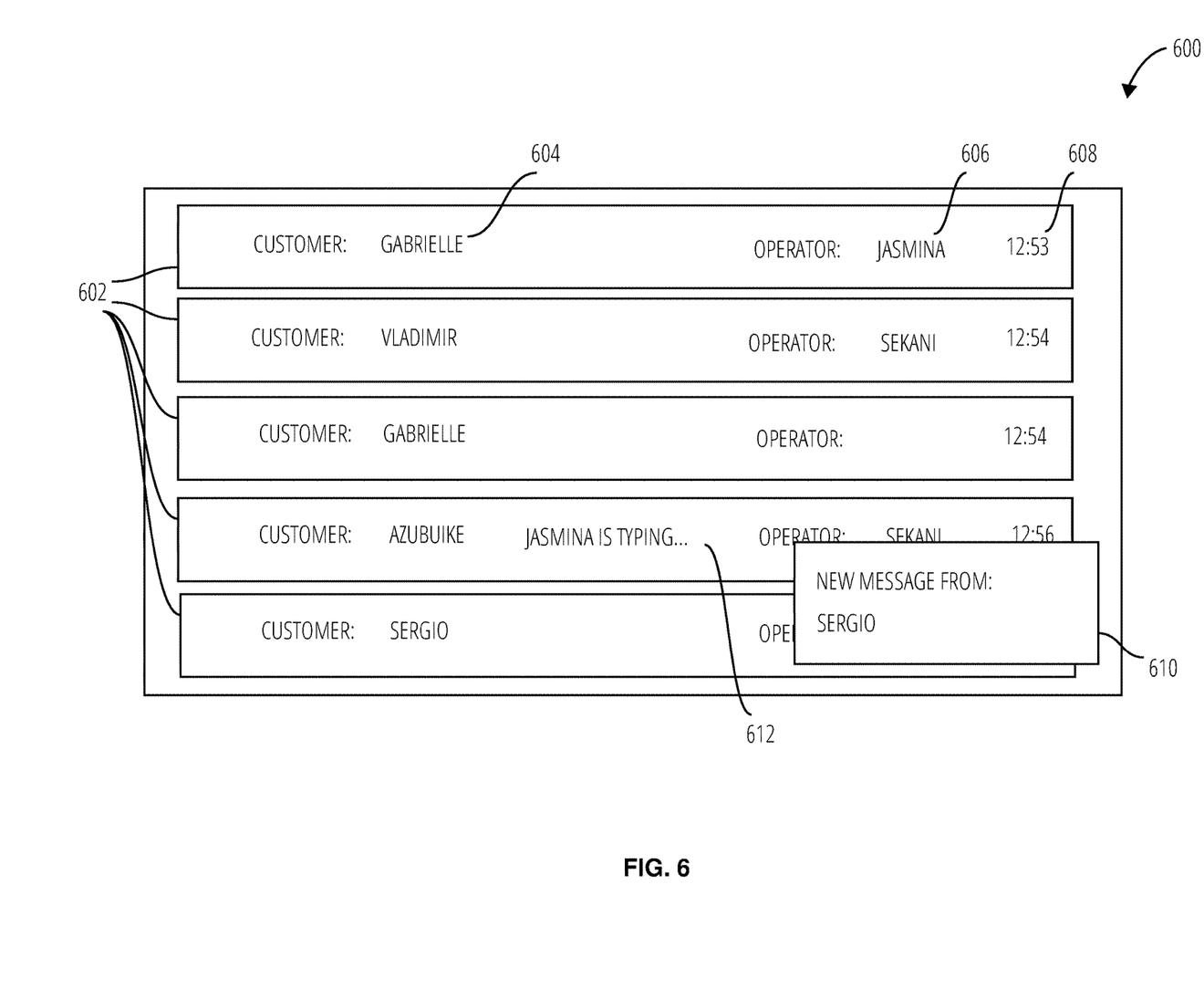
FIG. 6 illustrates an embodiment of a graphical user interface 600.
Figure 7:
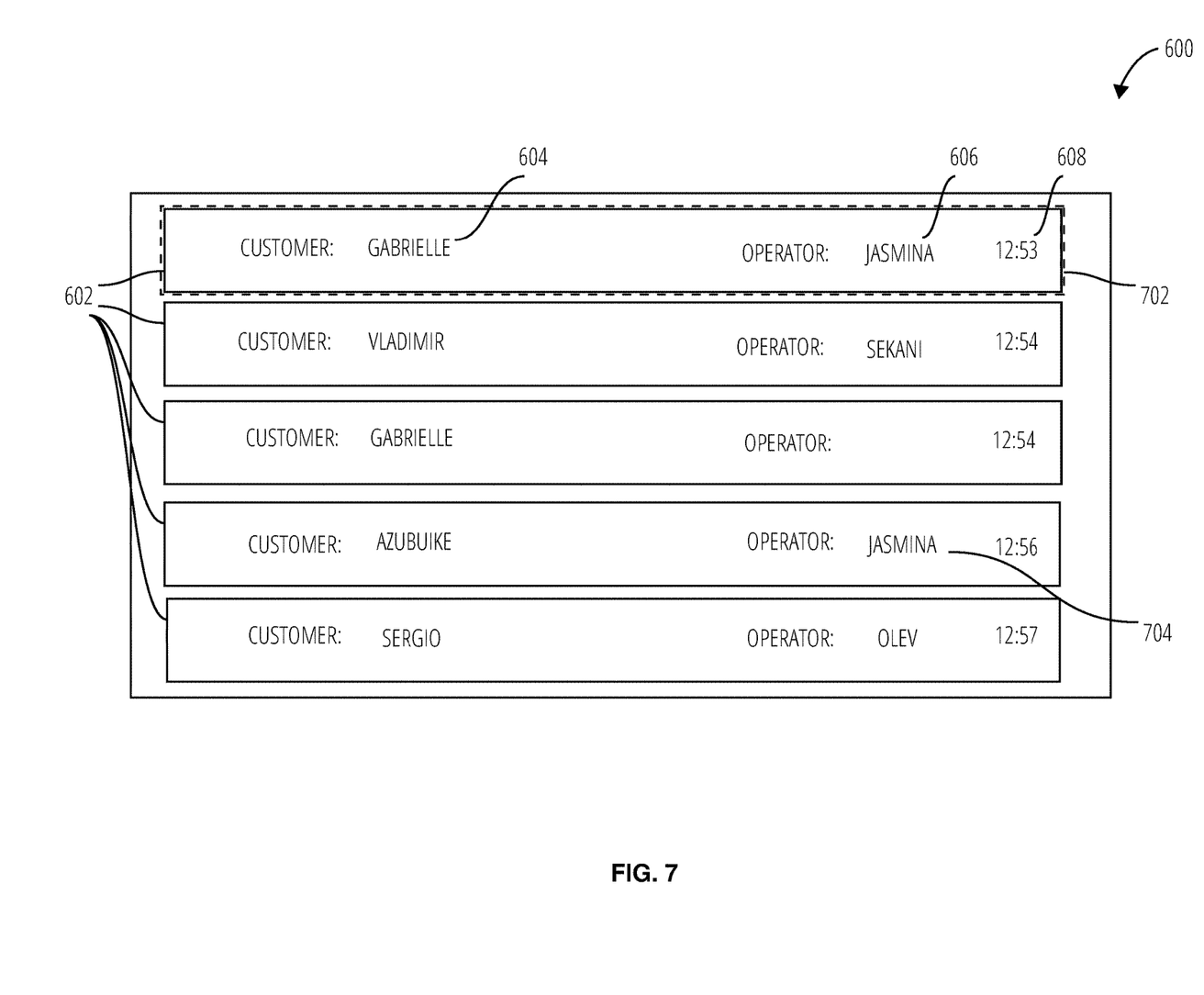
FIG. 7 illustrates an embodiment of a graphical user interface 600.
Figure 8:
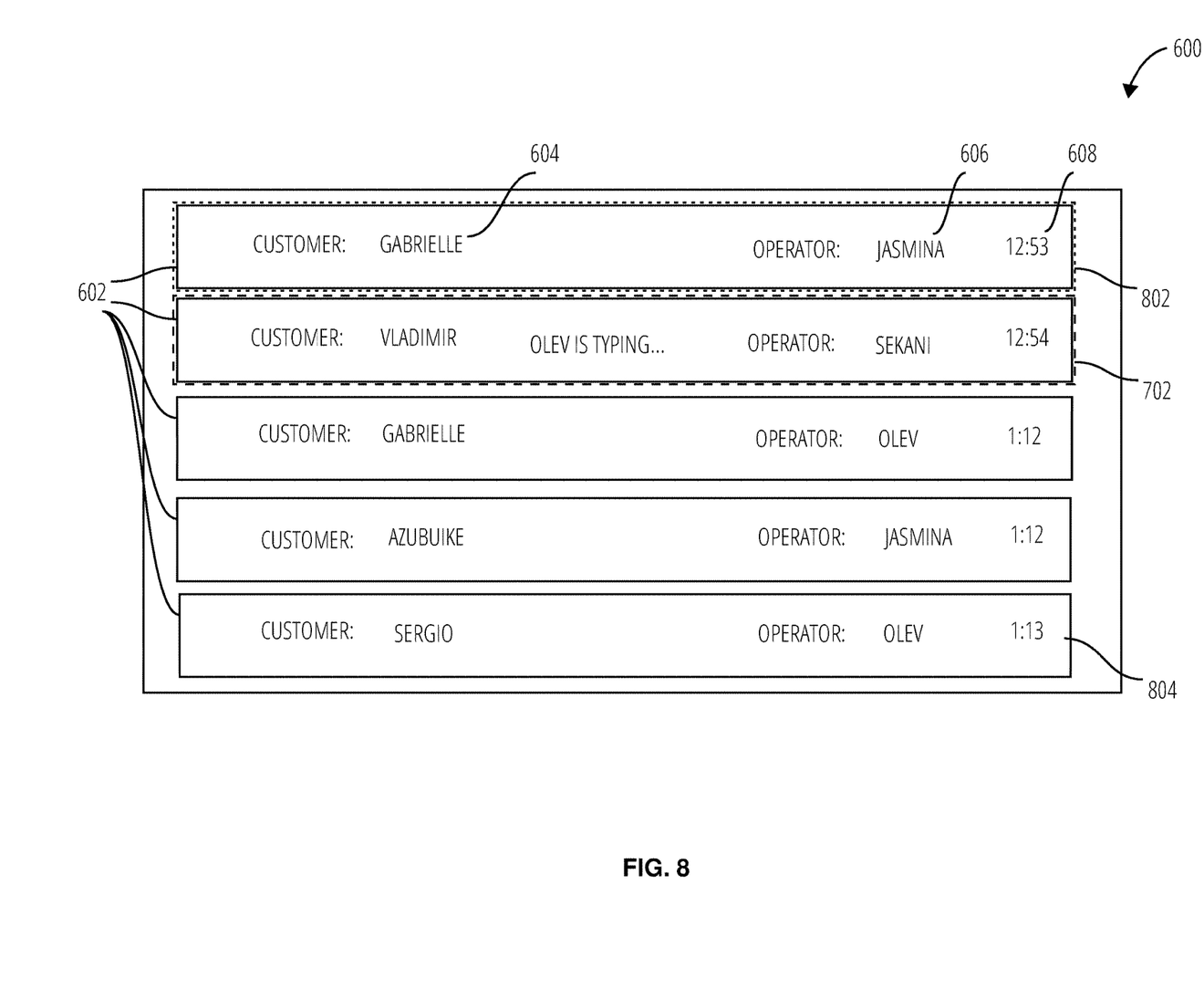
FIG. 8 illustrates an embodiment of a graphical user interface 600.

Referring to FIG. 6-FIG. 8, a graphical user interface 600 comprises conversations 602, a customer indicator 604, an operator indicator 606, a timestamp 608, an alert indication 610, and a responding action indicator 612. a first timer indicator 702, and an updated operator indicator 704. a second timer indicator 802, and an updated timestamp 804. As the plurality of graphical user interfaces receives inputs from operators, the graphical user interface 600 is altered to display the various components. Inputs may also be received by the graphical user interface 600 to alter the other of the plurality of graphical user interfaces.

FIG. 6 depicts the graphical user interface 600 in a first state. The conversations 602 are displayed based on their priority as determined by a message queue and a prioritization control memory structure. Here, the priority is based on the timestamp of each conversation, such as the timestamp 608. The conversations 602 may be oriented in a stack with higher priority at the top of the stack. Other embodiments may include a list, a left-to-right orientation, etc.

Each of the conversations 602, in addition to the timestamp 608 depicting the conversation timestamp, may display the customer indicator 604 and the operator indicator 606. The customer indicator 604 may be associated with the conversation based on the messages received. Here, the customer indicator 604 indicates the first name of the customer (or client). The customer indicator 604 may be altered to depict more or other information, such as a customer number associated with a client device, a last name, a title, etc. The operator indicator 606 here indicated the first name of the operator associated with the operator account associated with the conversation. The operator account associated with the conversation may be updated based on the actions of each operator. In some embodiments, the last operator to send a reply message to a client device associated with the conversation has their operator account associated with the conversation.

The graphical user interface 600 may also display the alert indication 610 in response to receiving a new message. In some embodiments, the list of the conversations 602 may not all be depicted on the graphical user interface 600. With a particular priority, a new message may not be depicted on the graphical user interface 600 and, the graphical user interface 600 may be manipulated to display the new conversation. The alert indication 610 may include an indication of the customer account sending the new message. The alert indication 610 may include other information, such as an indication of the operator account associated with the new message, if any.

Figure 9:
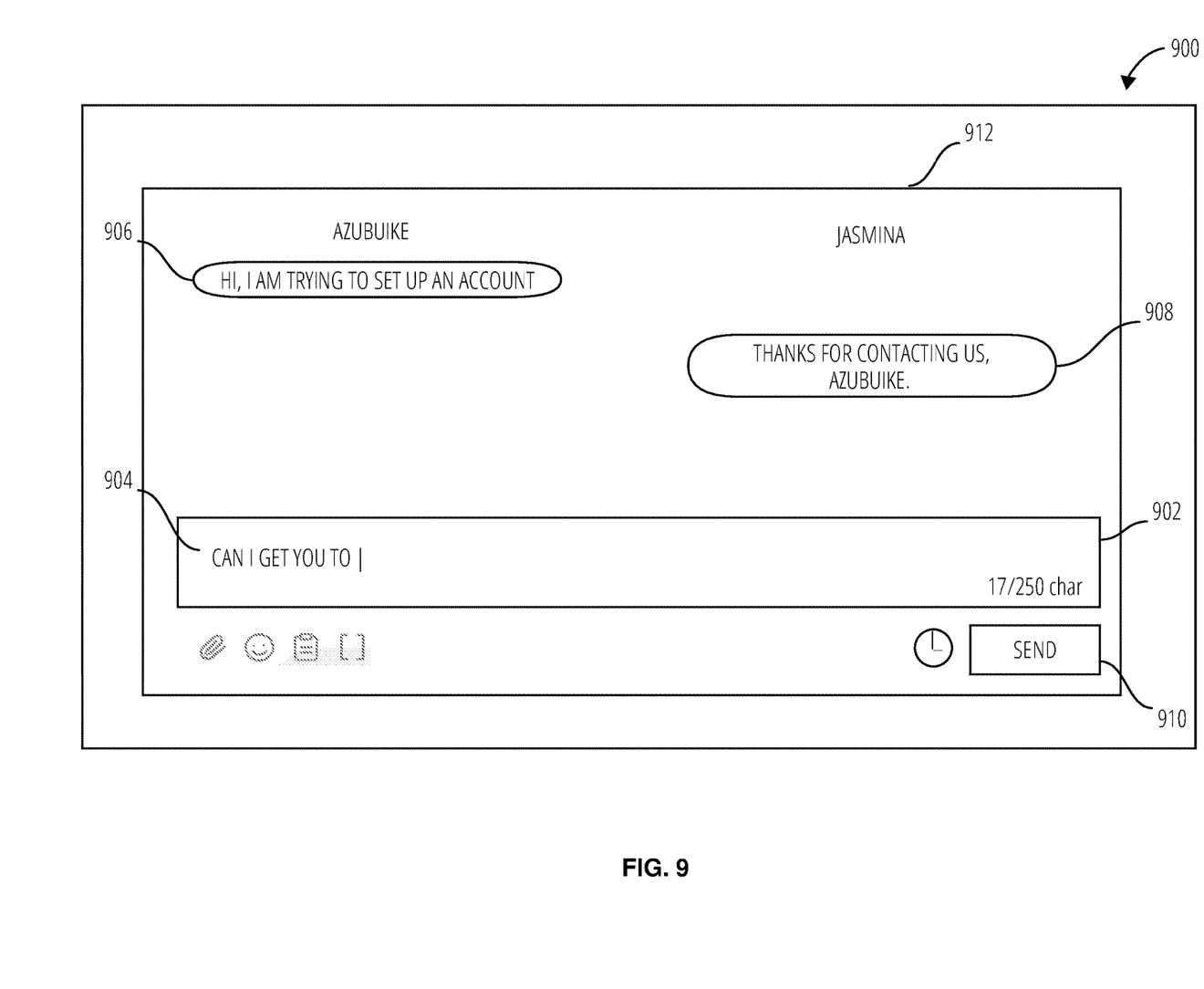
FIG. 9 illustrates an embodiment of a graphical user interface 900.

Each conversation may further include a responding action indicator 612. The responding action indicator 612 may indicated that another operator account is performing an action with that conversation. For example, the operator account associated with "Jasmina" is performing a responding action. This responding action is depicted in FIG. 9. Each of the conversations 602 may receive an input to alter the focus of the graphical user interface 600 to receive further inputs, such as adding text to a text message box and generating a reply message. FIG. 9 depicts such a graphical user interface 900.

FIG. 7 depicts the graphical user interface 600 after a period of time has elapsed and the graphical user interface 900 has sent a reply message to a client device associated with the conversation. The first timer indicator 702 indicates that for the indicated conversation, that a first pre-determined time period has elapsed from the timestamp, and the timer has not been reset by another action, such as a reply message or deleting the conversation. The first timer indicator 702 may alter the background color of the conversation, the color of the indicators associated with the conversation, may generate an animation related to the conversation, etc. The first timer indicator 702 may remain until an action input is received or a second pre-determined time period has elapsed for that conversation. The updated operator indicator 704 indicates the operator account associated with the conversation has been update. For example, the operator may have altered the graphical user interface to send a reply message to a client device. The operator account was then updated in an operator control memory structure, which updated the message queue. The message queue then re-configured each of the plurality of graphical user interfaces to display the updated operator indicator 704.

FIG. 8 depicts the graphical user interface 600 after another period of time has elapsed and operators have replied to some of the conversations 602, and new messages have been received. A different conversation now has the first timer indicator 702 as the first pre-determined time period has elapsed for that conversation, but the second pre-determined time period has not.

The second timer indicator 802 depicts that the second pre-determined time period has elapsed for that conversation. The first timer indicator 702 has been altered to the second timer indicator 802. The second timer indicator 802 may alter the background color of the conversation, the color of the indicators associated with the conversation, may generate an animation related to the conversation, etc. However, the second timer indicator 802 may not be the same as the first timer indicator 702. The second timer indicator 802 may remain until an action input is performed associated with that conversation.

The updated timestamp 804 indicates that the timestamp associated with the conversation has been updated. For example, another message may have been received from the client device associated with that conversation. This message may have been received subsequent to a reply message being sent that is associated with that conversation.

Referring to FIG. 9, a graphical user interface 900 comprises a text message box 902, a text 904, a message 906, a reply message 908, a reply message generator 910, and a window edge 912. The graphical user interface 900 may overlay the graphical user interface 600 when one of the conversations 602 is selected from the graphical user interface 600.

The graphical user interface 900 may receive an input to insert the text 904 into the text message box 902. Such an input may be determined to be a responding action and utilized to update the plurality of graphical user interfaces, such as depicted in FIG. 6. The message 906 and the reply message 908 are previous messages and reply messages in the conversation. The reply message generator 910 may receive an input to convert the text 904 in the text message box 902 into the message body of a reply message to be sent to a client device. Such an input may be determined to be an action input and update the graphical user interface 600 by, for example, re-prioritizing the conversations 602, updating the operator account, etc. An input to the reply message generator 910 may alter the graphical user interface 900 to the graphical user interface 600. For example, the graphical user interface 900 may be sent to the background and the graphical user interface 600 may be sent to the foreground. In other embodiments, the graphical user interface 900 may be closed, displaying the graphical user interface 600. The window edge 912 may depict a boundary that may determine a different input received inside the window edge 912 than outside. An input inside the window edge 912 may keep focus on the graphical user interface 900. An input outside the window edge 912 may alter the focus of the graphical user interface 900 and may be determined to be a cessation action. The input may alter the graphical user interface 900 to the graphical user interface 600.

Figure 10:
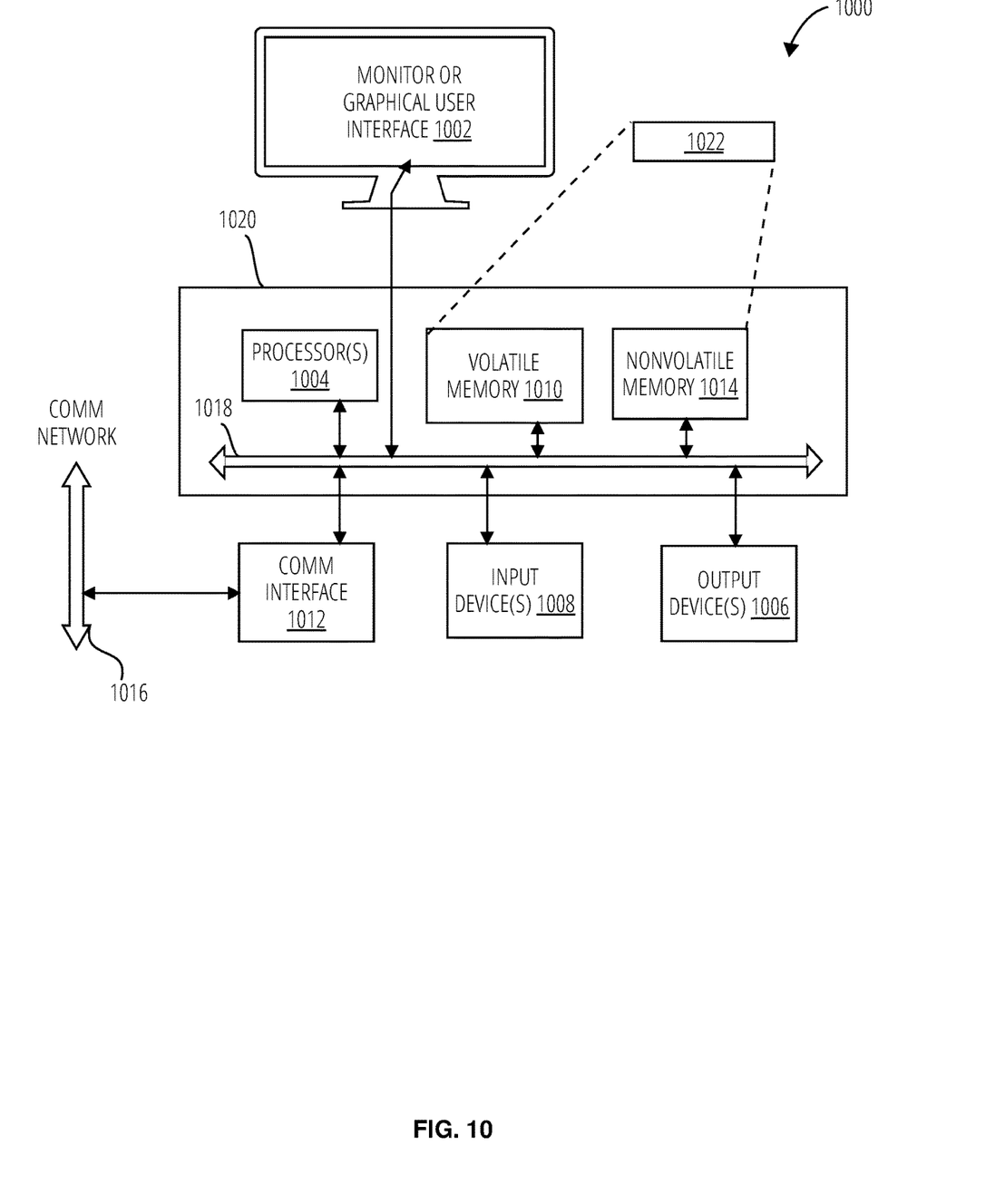
FIG. 10 is an example block diagram of a computing device 1000 that may incorporate embodiments of the present invention.

FIG. 10 is an example block diagram of a computing device 1000 that may incorporate embodiments of the present invention. FIG. 10 is merely illustrative of a machine system to carry out aspects of the technical processes described herein, and does not limit the scope of the claims. One of ordinary skill in the art would recognize other variations, modifications, and alternatives. In one embodiment, the computing device 1000 typically includes a monitor or graphical user interface 1002, a data processing system 1020, a communication network interface 1012, input device(s) 1008, output device(s) 1006, and the like.

As depicted in FIG. 10, the data processing system 1020 may include one or more processor(s) 1004 that communicate with a number of peripheral devices via a bus subsystem 1018. These peripheral devices may include input device(s) 1008, output device(s) 1006, communication network interface 1012, and a storage subsystem, such as a volatile memory 1010 and a nonvolatile memory 1014.

The volatile memory 1010 and/or the nonvolatile memory 1014 may store computer-executable instructions and thus forming logic 1022 that when applied to and executed by the processor(s) 1004 implement embodiments of the processes disclosed herein.

The input device(s) 1008 include devices and mechanisms for inputting information to the data processing system 1020. These may include a keyboard, a keypad, a touch screen incorporated into the monitor or graphical user interface 1002, audio input devices such as voice recognition systems, microphones, and other types of input devices. In various embodiments, the input device(s) 1008 may be embodied as a computer mouse, a trackball, a track pad, a joystick, wireless remote, drawing tablet, voice command system, eye tracking system, and the like. The input device(s) 1008 typically allow a user to select objects, icons, control areas, text and the like that appear on the monitor or graphical user interface 1002 via a command such as a click of a button or the like.

The output device(s) 1006 include devices and mechanisms for outputting information from the data processing system 1020. These may include the monitor or graphical user interface 1002, speakers, printers, infrared LEDs, and so on as well understood in the art.

The communication network interface 1012 provides an interface to communication networks (e.g., communication network 1016) and devices external to the data processing system 1020. The communication network interface 1012 may serve as an interface for receiving data from and transmitting data to other systems. Embodiments of the communication network interface 1012 may include an Ethernet interface, a modem (telephone, satellite, cable, ISDN), (asynchronous) digital subscriber line (DSL), Fire-Wire, USB, a wireless communication interface such as BlueTooth or WiFi, a near field communication wireless interface, a cellular interface, and the like.

The communication network interface 1012 may be coupled to the communication network 1016 via an antenna, a cable, or the like. In some embodiments, the communication network interface 1012 may be physically integrated on a circuit board of the data processing system 1020, or in some cases may be implemented in software or firmware, such as "soft modems", or the like.

The computing device 1000 may include logic that enables communications over a network using protocols such as HTTP, TCP/IP, RTP/RTSP, IPX, UDP and the like.

The volatile memory 1010 and the nonvolatile memory 1014 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1010 and the nonvolatile memory 1014 may be configured to store the basic programming and data constructs that provide the functionality of the disclosed processes and other embodiments thereof that fall within the scope of the present invention.

Logic 1022 that implements embodiments of the present invention may be stored in the volatile memory 1010 and/or the nonvolatile memory 1014. Said logic 1022 may be read from the volatile memory 1010 and/or nonvolatile memory 1014 and executed by the processor(s) 1004. The volatile memory 1010 and the nonvolatile memory 1014 may also provide a repository for storing data used by the logic 1022.

The volatile memory 1010 and the nonvolatile memory 1014 may include a number of memories including a main random access memory (RAM) for storage of instructions and data during program execution and a read only memory (ROM) in which read-only non-transitory instructions are stored. The volatile memory 1010 and the nonvolatile memory 1014 may include a file storage subsystem providing persistent (non-volatile) storage for program and data files. The volatile memory 1010 and the nonvolatile memory 1014 may include removable storage systems, such as removable flash memory.

The bus subsystem 1018 provides a mechanism for enabling the various components and subsystems of data processing system 1020 communicate with each other as intended. Although the communication network interface 1012 is depicted schematically as a single bus, some embodiments of the bus subsystem 1018 may utilize multiple distinct busses.

It will be readily apparent to one of ordinary skill in the art that the computing device 1000 may be a device such as a smartphone, a desktop computer, a laptop computer, a rack-mounted computer system, a computer server, or a tablet computer device. As commonly known in the art, the computing device 1000 may be implemented as a collection of multiple networked computing devices. Further, the computing device 1000 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

"conversation" in this context refers to one or more messages associated with a client account.

"timestamp" in this context refers to a digital record of the time of occurrence of a particular event.

"message" in this context refers to an electronic communication between two accounts (or numbers), such as via a SMS or other messaging service.

"message queue" in this context refers to a listing of one or more messages.

"text" in this context refers to alphabetic and numeric characters.

"graphical user interface" in this context refers to a visual way of interacting with a computer using items such as windows, icons, and menus, used by most modern operating systems.

"message body" in this context refers to an arrangement of text and dynamic fields.

"text message" in this context refers to electronic messages, typically comprising alphabetic and numeric characters, formatted to be transmitted by a SMS server.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A method comprising:
receiving a message;
associating a first timestamp with the message;
adding the message to a conversation in a message queue, thereby associating the first timestamp with the conversation, the message queue comprising one or more conversations, each of the one or more conversations having a second timestamp;
selectively updating the second timestamp of the conversation with a same value of the first timestamp;
prioritizing the one or more conversations in the message queue based on the second timestamp of each of the one or more conversations;
initiating a timer for each of the one or more conversations based on the second timestamp of each of the one or more conversations;
configuring a plurality of graphical user interfaces to display the message queue; and
re-configuring the plurality of graphical user interfaces to display a first visual indication for a first group of the one or more conversations, the first group of the one or more conversations including each of the one or more conversations for which the timer determines that a first pre-determined time period has elapsed from the second timestamp of each the one or more conversations.

2. The method of claim 1, re-configuring the plurality of graphical user interfaces to display a second visual indication for a second group of the one or more conversations, the second group of the one or more conversations including each of the one or more conversations for which the timer determines that a second pre-determined time period has elapsed from the second timestamp of each of the one or more conversations, wherein the second group is a subset of the first group.

3. The method of claim 1, further comprising:
determining that an action input has been received at one of the plurality of graphical user interfaces; and
in response to receiving the action input, stopping the timer.

4. The method of claim 3, wherein the action input is a reply message to the message.

5. The method of claim 1, further comprising, in response to receiving the message, configuring the plurality of graphical user interfaces to display an alert indication.

6. The method of claim 1, wherein updating the second timestamp associated with the conversation associated with the first timestamp comprises:
determining a previous message associated with the second timestamp; and
determining whether the previous message was either (a) received from a client device, or (b) sent to the client device, wherein
on condition (a), not updating the second timestamp, and
on condition (b), updating the second timestamp to the first timestamp.

7. The method of claim 1, further comprising:
determining a reply message is sent from one of the plurality of graphical user interfaces;
associating an operator account with the reply message;
updating the message queue with the operator account; and
re-configuring the plurality of graphical user interfaces to display a second visual indication, the second visual indication indicating the operator account associated with the reply message.

8. The method of claim 1, further comprising:
determining a responding action is occurring at one of the plurality of graphical user interfaces, the responding action comprising receiving text in a text message box associated with one of the one or more conversations;
associating an operator account with the responding action; and
re-configuring the plurality of graphical user interfaces to display a second visual indication for the one of the one or more conversations, the second visual indication indicating the operator account associated with the responding action.

9. The method of claim 8, further comprising:
determining a buffer time period;
initiating a second timer in response to an initial responding action;
resetting the second timer in response to a subsequent responding action; and
in response to the second timer determining the buffer time period has elapse, re-configuring the plurality of graphical user interfaces to remove the second visual indication for the one of the one or more conversations.

10. The method of claim 8, further comprising re-configuring the plurality of graphical user interfaces to remove the second visual indication for the one of the one or more conversations in response to determining a cessation action has occurred at the one of the plurality of graphical user interfaces, the cessation action including losing focus on a window associated with the responding action and deleting the message or the one of the one or more conversations from the message queue.

11. A computing apparatus, the computing apparatus comprising:
a processor; and
a memory storing instructions that, when executed by the processor, configure the apparatus to:
receive a message;

associate a first timestamp with the message;
add the message to a conversation in a message queue, thereby associating the first timestamp with the conversation, the message queue comprising one or more conversations, each of the one or more conversations having a second timestamp;
selectively update the second timestamp of the conversation with a same value of the first timestamp;
prioritize the one or more conversations in the message queue based on the second timestamp of each of the one or more conversations;
initiate a timer for each of the one or more conversations based on the second timestamp of each of the one or more conversations;
configure a plurality of graphical user interfaces to display the message queue; and
re-configure the plurality of graphical user interfaces to display a first visual indication for a first group of the one or more conversations, the first group of the one or more conversations including each of the one or more conversations for which the timer determines that a first pre-determined time period has elapsed from the second timestamp of each the one or more conversations.

12. The computing apparatus of claim 11, re-configure the plurality of graphical user interfaces to display a second visual indication for a second group of the one or more conversations, the second group of the one or more conversations including each of the one or more conversations for which the timer determines that a second pre-determined time period has elapsed from the second timestamp of each of the one or more conversations, wherein the second group is a subset of the first group.

13. The computing apparatus of claim 11, wherein the instructions further configure the apparatus to:
determine that an action input has been received at one of the plurality of graphical user interfaces; and
in response to receiving the action input, stopping the timer.

14. The computing apparatus of claim 13, wherein the action input is a reply message to the message.

15. The computing apparatus of claim 11, wherein the instructions further configure the apparatus to, in response to receiving the message, configuring the plurality of graphical user interfaces to display an alert indication.

16. The computing apparatus of claim 11, wherein updating the second timestamp associated with the conversation associated with the first timestamp comprises:
determine a previous message associated with the second timestamp; and
determine whether the previous message was either (a) received from a client device, or (b) sent to the client device, wherein
on condition (a), not update the second timestamp, and
on condition (b), update the second timestamp to the first timestamp.

17. The computing apparatus of claim 11, wherein the instructions further configure the apparatus to:
determine a reply message is sent from one of the plurality of graphical user interfaces;
associate an operator account with the reply message;
update the message queue with the operator account; and
re-configure the plurality of graphical user interfaces to display a second visual indication, the second visual indication indicating the operator account associated with the reply message.

18. The computing apparatus of claim 11, wherein the instructions further configure the apparatus to:
determine a responding action is occurring at one of the plurality of graphical user interfaces, the responding action comprising receiving text in a text message box associated with one of the one or more conversations;
associate an operator account with the responding action; and
re-configure the plurality of graphical user interfaces to display a second visual indication for the one of the one or more conversations, the second visual indication indicating the operator account associated with the responding action.

19. The computing apparatus of claim 18, wherein the instructions further configure the apparatus to:
determine a buffer time period;
initiate a second timer in response to an initial responding action;
reset the second timer in response to a subsequent responding action; and
in response to the second timer determining the buffer time period has elapse, re-configure the plurality of graphical user interfaces to remove the second visual indication for the one of the one or more conversations.

20. The computing apparatus of claim 18, wherein the instructions further configure the apparatus to re-configure the plurality of graphical user interfaces to remove the second visual indication for the one of the one or more conversations in response to determining a cessation action has occurred at the one of the plurality of graphical user interfaces, the cessation action including losing focus on a window associated with the responding action and deleting the message or the one of the one or more conversations from the message queue.

* * * * *